Patented Oct. 15, 1929

1,731,333

UNITED STATES PATENT OFFICE

JOSEPH G. DAVIDSON, OF YONKERS, NEW YORK, ASSIGNOR TO CARBIDE AND CARBON CHEMICALS CORPORATION, A CORPORATION OF NEW YORK

LACQUER

No Drawing.   Application filed April 25, 1927. Serial No. 186,595.

This invention relates to lacquers of the pyroxylin or nitrocellulose type. It is the custom of manufacturers to prepare lacquers of this type for distribution to users in a concentrated somewhat viscous state, ill-suited for use with the spraying implements generally employed in the application of pyroxylin finishes on a large scale. It is common practice, therefore, for the user to mix the lacquer as supplied by the manufacturer with a certain proportion of a so-called "thinner" in order to reduce the viscosity to the extent necessary to permit application with spraying implements. The thinner composed of volatile solvents and diluents constitutes, with the solvents and diluents already in the lacquer as originally prepared, merely a vehicle for the pyroxylin and gums which constitute the body of the finish. The solvents and diluents of the lacquer evaporate completely in the drying process and therefore are lost when they have fulfilled their function in connection with the application of the lacquer.

Inasmuch as it is customary to use substantially as much thinner as original concentrated lacquer composition, it will be obvious that the cost of the thinner is a material item in the total cost of the finished coating. It is an object of this invention to produce a thinner for pyroxylin lacquers at a low cost but possessed of the properties essential to enable a satisfactory dried lacquer film to be formed on the surface to be lacquered.

It is not enough that a thinner for the kind of lacquers under consideration may be an excellent volatile solvent for pyroxylin or nitrocellulose. A suitable thinner must include a certain amount of solvents for the gums usually present in pyroxylin lacquers, as well as for the pyroxylin. It is further essential that these solvents shall remain in the coating, after its application to the body to be coated, in such proportions as to prevent precipitation or hardening of one of the lacquer-body ingredients previous to the others during the drying period. It is also essential, particularly in moist atmospheres, that the solvents, especially those of slower rate of evaporation shall have a relatively low affinity for water, inasmuch as the presence in the lacquer film of moisture in excess of certain very low proportions is likely to result in the formation of whitish areas known in the trade as "bloom" whereby the uniformity and beauty of the dried lacquer coating is injuriously affected.

In my application for patent S. N. 719,891, I have disclosed and claimed monoethyl ether of ethylene glycol as a solvent for cellulose derivatives, such as cellulose nitrate. This ether has a boiling point of about 134° C. and is a powerful solvent for pyroxylin. It is therefore admirably adapted to constitute a part of the high-boiling pyroxylin-solvent fraction of a thinner such as is discussed above. The ether, however, is rather hygroscopic, and this fact imposes a limit on the proportion of the ether which can be used in a lacquer likely to be used in a moist atmosphere.

I have discovered that non-blooming lacquers of excellent quality can be prepared by the use of the monoethyl ether of ethylene glycol in conjunction with the acetate of monoethyl ether of ethylene glycol. The latter compound boils at about 153° C., is a good solvent for pyroxylin, and is substantially non-hygroscopic. This combination of properties makes it available to supplement the action of the ether while in a large measure counteracting the liability to bloom to which the ether is subject. Approximately equal parts of the ether and its acetate may be used, for example, to produce a high boiling pyroxylin solvent mixture. In addition the thinner should contain a more volatile solvent for pyroxylin, and a gum solvent. The more volatile solvent may be, for example, ethyl acetate (boiling point about 77° C.) or a mixture of ethyl acetate and ethyl alcohol. The alcohol boils at about 78° C.

As solvents for gums and diluent for the thinner I may utilize some well known hydrocarbon solvents, such as toluol or mixtures of toluol with other hydrocarbons such as xylol, or petroleum naphthas. The boiling point of the selected gum solvent should be such that the lower boiling point pyroxylin solvent evaporates in such proportions to said gum solvent (which is a major ingredient with respect to volume) that the solvent properties of the thinner ingredients remain approximately constant nearly to the end of the evaporating period, whereupon the solvent properties of the high boiling glycol ether and the acetate thereof predominate.

As an example of one composition suitable for use as a thinner for pyroxylin lacquers according to my invention the following may be given:

| | Per cent |
|---|---|
| Ethyl alcohol | 10 |
| Ethyl acetate | 10 |
| Toluol | 50 |
| Xylol | 10 |
| Monoethyl ether of ethylene glycol | 10 |
| Acetate of monoethyl ether of ethylene glycol | 10 |

In this formula it may be preferable to reduce the total proportion of the last two named ingredients while leaving their relative proportions approximately the same, which may be done by correspondingly increasing the percentage of toluol and of ethyl acetate. Xylol, also may be replaced by an additional equal quantity of toluol. Petroleum naphthas may be used as substitutes for or as additions to the gum solvents mentioned. Where petroleum naphthas are used the proportion of low boiling point pyroxylin solvent may be increased to as high as 30% more or less.

In a vehicle or thinner having a combination of solvents as described, the proportions are such that the lower boiling solvent for pyroxylin, as ethyl acetate for example, evaporates from the coating in such proportions relative to the evaporation of the major ingredient, as toluol, that the solvent properties of the remaining ingredients do not vary to a material extent. The higher boiling solvents, such as the glycol ether and the acetate thereof remain in the coating to a large extent until the toluol or other gum solvent is mostly evaporated, whereupon the solvent properties of the former predominate. The proportions, therefore, of pyroxylin solvents to the other materials remain sufficiently constant in the thinner to prevent any undesirable separation of the constituents in drying. The last of the thinner to evaporate in a properly proportioned combination, furthermore, has the highly desirable property of non-affinity for water.

Although I have cited certain exemplary compositions suitable for solvents and diluents of the nitrocellulose and gums that form the body of lacquers made in accordance with this invention, I do not intend that my invention shall be limited to the examples cited, as the skilled chemist may be able to apply the principle of the invention in other specific compositions.

I claim:
1. A thinner for pyroxylin lacquers comprising a low boiling point pyroxylin solvent in the proportion of not substantially to exceed 30%; a high boiling point pyroxylin solvent to an amount of not substantially more than 20% and comprising approximately equal quantities of monoethyl ether of ethylene glycol and the acetate of monoethyl ether of ethylene glycol; and the remainder a hydrocarbon solvent and diluent having a boiling point range such that the solvent properties of the several ingredients remain substantially constant until nearly the end of the evaporating period whereupon the solvent properties of pyroxylin solvents predominate.

2. A thinner for pyroxylin lacquers comprising not substantially more than 30% of ethyl acetate and ethyl alcohol, not substantially more than 20% of monoethyl ether of ethylene glycol and the acetate of monoethyl ether of ethylene glycol, and the remainder a suitable hydrocarbon solvent.

In testimony whereof, I affix my signature.

JOSEPH G. DAVIDSON.